United States Patent [19]
Petrik et al.

[11] 3,888,728
[45] June 10, 1975

[54] PROCESS FOR MANUFACTURING CARRIER SHEETS TREATED WITH HARDENABLE AMINOPLAST RESIN PRELIMINARY CONDENSATES FOR SURFACE COATING

[75] Inventors: Bruno Petrik; Erich Ruf, both of Essen, Germany

[73] Assignee: TH Goldschmidt AG, Essen, Germany

[22] Filed: Sept. 10, 1973

[21] Appl. No.: 395,549

[30] Foreign Application Priority Data
Oct. 18, 1972 Germany.............................. 2250991

[52] U.S. Cl.............. 162/167; 260/21; 260/29.4 R; 260/31.6; 427/445
[51] Int. Cl............................................. D21h 1/40
[58] Field of Search...... 117/155 L, 161 L, 161 LN; 260/21, 29.4 R, 31.6

[56] References Cited
UNITED STATES PATENTS

| 2,187,566 | 1/1940 | Bruson | 260/31.6 X |
| 2,629,701 | 2/1953 | Ericks | 260/31.6 X |
| 2,765,243 | 10/1956 | Aycock et al. | 117/155 L |
| 2,920,984 | 1/1960 | Moynihan | 117/155 X |
| R24,003 | 5/1955 | Ericks | 117/155 X |
| R24,011 | 5/1955 | Ericks | 117/155 X |

Primary Examiner—Michael R. Lusignan
Attorney, Agent, or Firm—James E. Bryan

[57] ABSTRACT

This invention relates to an improvement in the process of making a carrier sheet by saturating said sheet with an aqueous solution of at least one hardenable aminoplast resin preliminary condensate, the improvement comprising including in said saturating solution about 0.05 to 3 percent by weight, based upon solid resin, of a compound selected from the group consisting of an ethylene glycol fatty acid ester and a propylene glycol fatty acid ester. The invention also includes novel carrier sheets produced by the novel process.

6 Claims, No Drawings

PROCESS FOR MANUFACTURING CARRIER SHEETS TREATED WITH HARDENABLE AMINOPLAST RESIN PRELIMINARY CONDENSATES FOR SURFACE COATING

The present invention relates to a process for manufacturing carrier sheets saturated with aqueous solutions of hardenable aminoplast resin preliminary condensates and coated, if desired, for the surface-improving coating of plates, sheets, or panels, particularly from wood materials.

It is known in the art to saturate and, if desired, coat carrier sheets, preferably webs of paper, with solutions of heat-hardenable aminoplast preliminary condensates. The solvent is water as a rule, and the concentration of resin in the solution may vary between approximately 30 and 70 percent by weight. Employed as aminoplast resin preliminary condensates are melamine- or urea-formaldehyde preliminary condensates and/or mixtures of such preliminary condensates. From the abundance of literature on the state of the art, only German Pat. No. 1,053,303 is mentioned here as an example. The products obtained in this manner from the process in question are frequently also described as films.

Such carrier sheets provided with hardenable synthetic resins are employed either for making laminated materials, or for the surface-improving coating of materials such as, for example, chip plates, fiber plates, or plywood plates.

The coating of this type of plates with carriers containing hardenable aminoplast resin is carried out in suitable presses, i.e., with the use of pressure and an elevated temperature while a specific pressing time is observed.

It has been found necessary to add to the solutions of the hardenable aminoplast resin preliminary condensates, materials which influence the properties of the resins prior to or during the hardening thereof. Exemplary of such admixed materials are wetting agents, in order that one may obtain a good wetting of the carrier sheets; hardeners, in order that one achieve a rapid hardening free from stress cracks of the preliminary condensates; and separating agents, in order that one bring about and assure a damage-free separation from the press plate of the coated material plates on the film side after the pressing operation.

These admixed materials have obtained particular importance in view of the fact that technological evolution on the one hand and further development of the aminoplast resin preliminary condensates on the other hand render it possible to carry out the coating operation within relatively brief periods of time. Such coatings are made in so-called short-stroke presses. It is understandable that, on the one hand, the aminoplast resin preliminary condensates harden rapidly but, on the other hand, they still must flow in such a manner that they will produce a continuous surface.

For this reason it is desirable to employ materials for admixing which are effective in small quantities and which are compatible both with the aminoplast resin preliminary condensate and, if necessary, with the other additions. In this connection, it is particularly desirable to employ as materials to be admixed compounds or compound mixtures which have a number of favorable properties with reference to the technique of using the resin-impregnated carrier sheets.

The object of the present invention is therefore a process in which, added to the solutions of the aminoplast resin preliminary condensates, are 0.05 to 3 percent by weight (based upon solid resin) of ethylene glycol or propylene glycol fatty acid esters.

The ethylene glycol or propylene glycol fatty acid esters which are added, according to the present invention, to the solutions of the aminoplast resin preliminary condensates are optimal improving agents and impart special properties not only to the synthetic resin solutions during the treatment thereof, but also to the carrier sheets as semi-finished products coated with hardenable synthetic resins, as well as to the fully hardened surfaces.

A particular advantage of the novel process is that the carrier sheets saturated with aqueous condensates and coated, if desired, are subjected in a heated drying channel to elevated temperatures while achieving similar contents of volatile constituents, and thereby can be dried more rapidly, and thus manufactured more rapidly.

The carrier sheets made as proposed by the present invention have a considerably smoother surface compared to the ordinary carrier sheets. Carrier sheets which are saturated and/or coated with the same saturating resins, yet without the addition of ethylene glycol or propylene glycol fatty acid esters, display a scabby or crusted surface and therefore give off dust when rolled or wound up and/or during the intermediate treatment thereof. During the final treatment, namely during the pressing, this uneven surface may give rise to the formation of pores, or to surface irregularities.

The products obtained with the process of the present invention display a reduced electrostatic charge so that such films will neither give off dust nor become dusty, which is of importance for storage and intermediate treatment, such as, for example, winding, rewinding, and cutting into formats or shapes, as well as for proper processing in the press.

Furthermore, the process products have a better sliding quality. This is of particular advantage in connection with intermediate processing for example during the format-cutting of films and the handling thereof, as well as during the processing of the formats obtained at that time, since the frictional resistance of the individual films with respect to each other is considerably reduced, and thus a more rapid operation is assured in a dust-free manner.

The inventive process also allows for the use of papers of a lesser quality as carrier sheets or webs, and particularly papers which are not fully satisfactory with regard to the porosity thereof. Nevertheless, the products obtained according to the inventive process display continuous surfaces during the impregnation and coating thereof, as well as in the hardened surface after the pressing operation. This is presumably due to the fact that the preliminary condensates containing alkylene glycol fatty acid esters flow better — during the pressing operation, i.e., under the influence of temperature and pressure — than do resins without the inventive addition.

The inventively added ethylene glycol or propylene glycol fatty acid esters are at the same time excellent internal separating agents so that the products obtained according to the process of the present invention may be processed in short-stroke presses and, after the rapid hardening required in that case, can be flawlessly separated from the press plate.

By the addition of the alkylene glycol fatty acid esters it is possible to make so-called plastic veneer films, i.e., synthetic resin-saturated carrier sheets, which are imprinted with a wood decoration. These so-called plastic veneer films are obtained during drying in condensed-out form and are cemented to the material plates. By virtue of the addition of the alkylene glycol fatty acid esters, these plastic veneer films are free from pores and impart a finished effect, so that an additional lacquering and/or the use of lacquer or finished-effect-forming substances during the impregnation and/or coating operations is rendered unnecessary.

The alkylene glycol fatty acid esters added according to the present invention display the sum total of the aforementioned properties all the more markedly the smaller the alkylene glycol residue is in proportion to the fatty acyl portion, and the higher-molecular weight are the fatty acyl groups.

The aim therefore, of the present invention is the addition of ethylene glycol or propylene glycol fatty acid esters, and specifically particularly of ethylene glycol distearate, or 1,2-propylene glycol mono-di-stearate, i.e., of a mixture of 1,2-propylene glycol mono-stearate and 1,2-propylene glycol distearate.

Since the compounds are not soluble, practically, in aqueous solutions of aminoplast resin preliminary condensates, it is desirable to admix these additions to the resin solution in the form of an aqueous dispersion. Such dispersions may be prepared in a simple manner with the use of non-ionogenic hydroxyalkylation products of partial fatty acid esters of multivalent alcohols. One example of such a product is polyhydroxyalkylene glycerine monostearate in admixture with polyhydroxyalkylene glycerine distearate. The polyhydroxyalkylene residue in such compounds should be within specific limits, which are determined by an HLB value, in order that stable dispersions be obtained.

The results of the inventive process were surprising since other fatty acid ester compounds, such as partial glycerine fatty acid esters, glycerine tri-fatty acid esters, and hydroxyalkylation products of partial fatty acid esters of tri- or multi-valent alcohols, display these properties only to a considerably lesser degree, or not at all. These compounds permit neither the use of high temperatures during drying, nor do they show a corresponding separation sliding effect, nor a corresponding reduction of the electrostatic charge.

The use of melamine-, quanidine and ammonium stearates as well as metal soaps, such as, for example, those of zinc- and calcium stearates, results frequently in adverse properties. The ethylene glycol or propylene glycol fatty acid esters added according to the present invention may be easily stirred into the saturating resins in the form of a dispersion.

As already has been indicated as characteristic of the present invention, the most favorable concentration for the use thereof is between 0.05 to 3 percent by weight of the esters, based upon solid resin.

When the resin-coating of the carrier sheets is carried out by a double saturation, it is recommended that the alkylene glycol fatty acid esters be admixed to the second resin, i.e., the coating resin.

The inventive process will now be described in further detail hereinafter on the basis of the following examples:

EXAMPLE 1

Impregnated with an aminoplast resin in an impregnation installation was a high-quality cellulose paper with a weight per unit area of 80 g/m$^2$. The paper impregnated in this manner was coated in one working operation to a final weight of 200 g/m$^2$ (after intermediate drying), in a dipping saturating process, with a melamine condensation resin made by the reaction of melamine and formaldehyde (in a 30 percent solution) in a molar ratio of 1 : 2.2, and contained, in addition to a hardener and wetting agent, 10 percent of a 5.33 percent by weight aqueous ethylene glycol distearate dispersion.

The ethylene glycol distearate employed was made in known manner by esterification of ethylene glycol with a fatty acid mixture having the composition given below — (% by weight)

| | |
|---|---|
| caprylic acid | <0.1 % |
| capric acid | 0.3 % |
| lauric acid | 1.9 % |
| pentadecanoic acid | 0.3 % |
| palmitic acid | 42.3 % |
| unsaturated fatty acids | 0.4 % |
| margaric acid | 1.7 % |
| stearic acid | 52.4 % |
| arachic acid | 0.7 % |

The film thus obtained had a smooth surface. The film speed was 27 m per minute. The surface resistance of this film was 1.2 · 10$^6$ MΩ. The ash test, which was conducted by placing a piece of film which had been rubbed three times lightly with cellulose paper onto a round glass bowl about a quarter full of cigar ash, showed practically no dusting of the test film.

The increased sliding effect of the film was determined as follows: The film to be tested was fixed on an inclined plane, at a variable adjustable angle of inclination, with the aid of a contact adhesive. By overlaying a 1 kg weight on which, at the contact surface, the same film was similarly fixed by means of a contact adhesive, sliding off of the weight was observed at a sliding angle of 4°.

During the pressing of the film to be tested onto a chip plate under short-stroke conditions with:

| | |
|---|---|
| press plate temperature | 160° C, |
| pressing pressure | 18 kp/cm$^2$, and |
| pressing time | 60 seconds, | a continuous and pore-free coating surface was obtained, as was evidenced by a graphite test that was also carried out.

Preparation of a 5.33% aqueous ethylene glycol distearate dispersion 16 g of ethylene glycol distearate and 4 g of polyhydroxy ethylene glycerine mono-di-stearate (55 percent mono- and 45 percent diester) are melted down by heating in a 250 ml beaker, and then heated to about 80°C while stirring. Further heated in a 600 ml beaker are 280 ml water, also to about 80°C. Thereafter, the melt heated to about 80°C is introduced, while stirring, into the 80°C water. The dispersion obtained thereby is stirred while cooling to at least 40°C.

Comparative Test

The same high-quality cellulose paper was impregnated in the manner described hereinabove in the same impregnating installation and coated in one working step, after intermediate drying, by dipping saturation with an analogous melamine condensation resin which contained, instead of ethylene glycol distearate, an addition of a commercial mineral oil emulsion suitable as a separating agent.

The film thus yielded could be dried and preliminarily condensed in a multi-zone suspending drier merely at a circulating air temperature of 130°–145°C. A foaming of the film surface occurred at that time so that the film prepared in this manner exhibited a crusty surface.

The film speed was 18 m per minute. The surface resistance of the comparative film thus produced was >10⁸ MΩ. The ash test showed a heavy dusting of the comparative film. The sliding angle of the comparative film, at which sliding off of the weight piece took place, was 27°.

The comparative film was pressed in an analogous fashion under short-stroke conditions with:

| | |
|---|---|
| press plate temperature | 160° C, |
| pressing pressure | 18 kp/cm², and |
| pressing time | 60 seconds. |

When the press was opened, a slight sticking of the coated chip plate was produced on the film side at the press plate.

The coating surface obtained by the pressing operation had pores, as shown by a graphite test.

EXAMPLE 2

A high-quality cellulose paper with a weight per unit area of 80 g/m² was impregnated, intermediately dried, and coated in the manner described in Example 1 above.

The analogous coating resin contained, instead of ethylene glycol distearate, 10 percent of a 5.33 percent by weight aqueous 1,2-propylene glycol-monodistearate dispersion (55 percent mono- and 45 percent diester).

The 1,2 propylene glycol-mono-di-stearate employed was prepared in known manner by esterification of 1,2-propylene glycol with a fatty acid mixture having the composition indicated in Example 1.

The film thus obtained was dried in a multi-zone suspending drier at a circulating air temperature of 160°C and preliminarily condensed. At that time, no foaming of the film surface was produced. The film obtained had a smooth surface. The film speed was 27 m per minute. The sliding angle, which was measured in the same manner as described in Example 1, was 20°. The ash test showed a slight dusting.

The preparation of the 5.33 percent aqueous 1,2-propylene glycol-mono-distearate dispersion was effected in the same manner as described in Example 1 above, with the exception that instead of ethylene glycol di-stearate, 1,2-propylene glycol-mono-di-stearate was employed.

EXAMPLE 3

A high-quality cellulose paper printed with a wood pattern and having a weight per unit area of 80 g/m² was impregnated in an impregnating installation with a urea condensation resin which was prepared by the reaction of urea and formaldehyde (37 percent solution) in a molar ratio of 1 : 1.8.

The film thus obtained was coated in one working step up to a final weight of 160 g/m², after intermediate drying, on the side of the decoration in a roller application process with a melamine condensation resin which was obtained by the reaction of melamine with formaldehyde (30 percent solution) in a molar ratio of 1 : 2.2 up to a turbidity point of 1 : 1.5, and contained, in addition to a hardener and wetting agent, an admixture of 6 percent of a 5.33 percent by weight aqueous ethylene glycol-distearate dispersion. The film thus prepared was dried in a suspending drier at a circulating air temperature of 160°C and condensed out.

The plastic veneer film prepared in this manner had on the side of the decoration, a smooth, continuous surface. After cementing this film, with the aid of a liquid adhesive, at a pressing pressure of 5 kp/cm², a pressing temperature of 140°C, and a pressing time of 30 seconds, onto a chip plate, a plastic veneer was obtained having a smooth, pore-free surface with a finished effect.

Comparative Test

A comparative plastic veneer film was prepared in an analogous fashion with the exception that during the second saturation in the roller application process, the saturating resin did not contain ethylene glycol distearate.

The plastic veneer film thus made had a crusty, discontinuous surface. After cementing the film with the aid of a liquid adhesive in an analogous fashion onto a chip plate, a plastic veneer was obtained having an uneven, pore-displaying surface, and thus lacking a finished effect.

It will be obvious to those skilled in the art that many modifications may be made within the scope of the present invention without departing from the spirit thereof, and the invention includes all such modifications.

What is claimed is:

1. In the process of making a carrier sheet by saturating said sheet with an aqueous solution of at least one hardenable aminoplast resin preliminary condensate, the improvement which comprises including in said saturating solution about 0.05 to 3 percent by weight, based upon solid resin, of a compound selected from the group consisting of an ethylene glycol fatty acid ester and a propylene glycol fatty acid ester.

2. A process according to claim 1 in which said ester is included in the form of an aqueous dispersion.

3. A process according to claim 1 in which said ester is selected from the group consisting of ethylene glycol distearate or 1,2-propylene glycol mono-di-stearate.

4. A carrier sheet saturated with an aqueous solution of at least one hardenable aminoplast resin preliminary condensate, said aqueous solution also containing about 0.05 to 3 percent by weight, based upon solid resin, of a compound selected from the group consisting of an ethylene glycol fatty acid ester and a propylene glycol fatty acid ester.

5. A carrier sheet according to claim 4 in which the ester is admixed with the aqueous solution of aminoplast resin preliminary condensate in the form of an aqueous dispersion.

6. A carrier sheet according to claim 4 in which the ester is selected from the group consisting of ethylene glycol distearate or 1,2-propylene glycol mono-di-stearate.

\* \* \* \* \*